Figure 1:
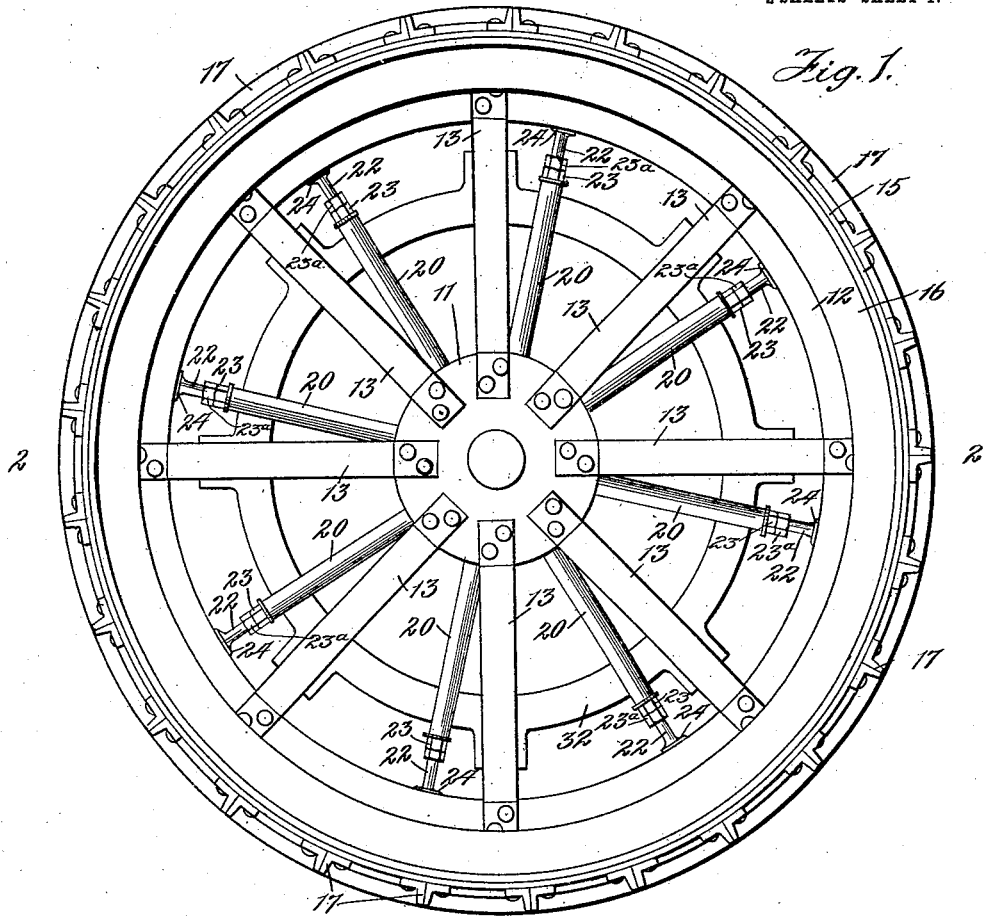

G. W. MORRIS.
VEHICLE WHEEL.
APPLICATION FILED JUNE 17, 1907.

917,883.

Patented Apr. 13, 1909.
2 SHEETS—SHEET 1.

Witnesses:

Inventor:
George W. Morris
Attys

THE NORRIS PETERS CO., WASHINGTON, D. C.

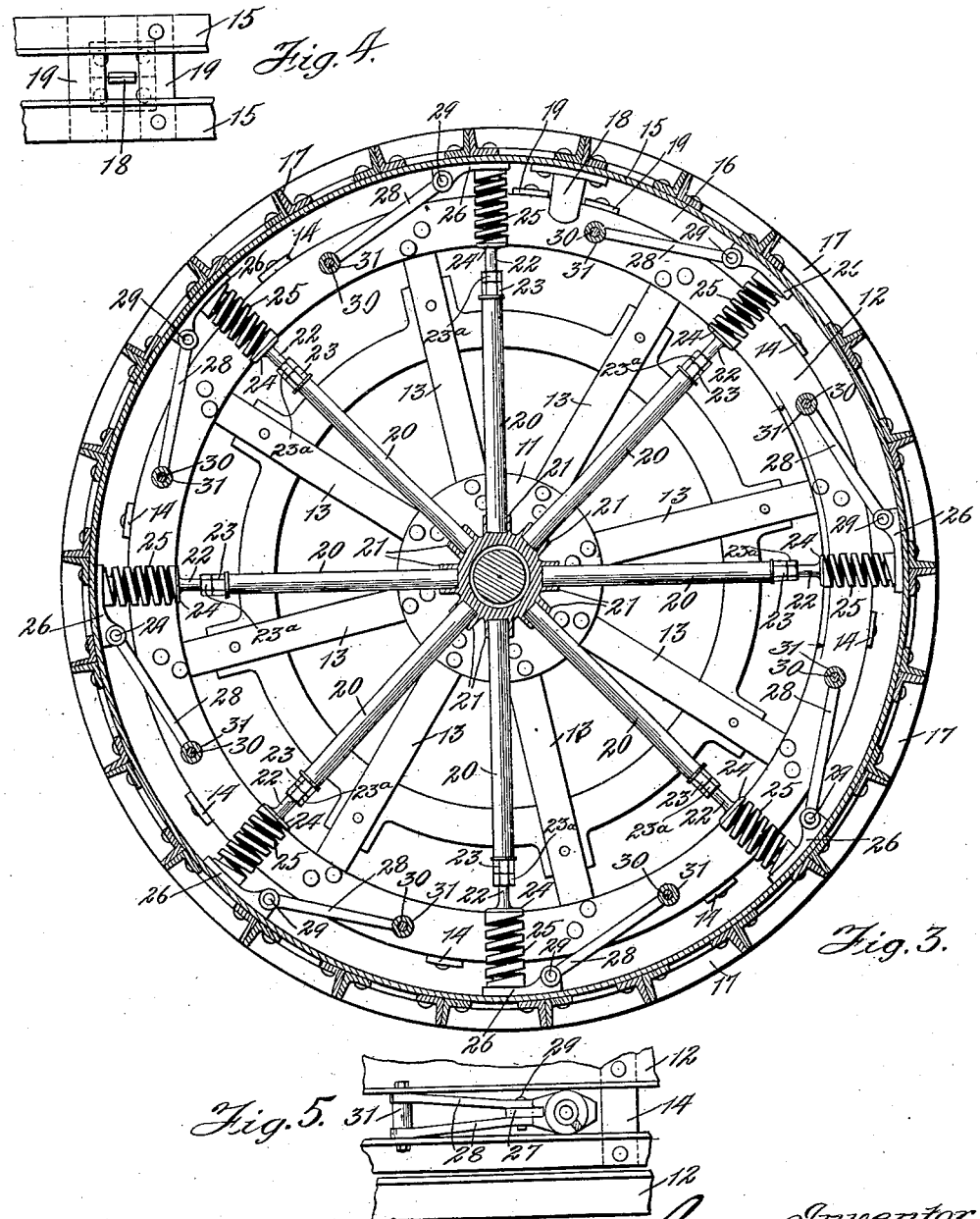

UNITED STATES PATENT OFFICE.

GEORGE W. MORRIS, OF RACINE, WISCONSIN.

VEHICLE-WHEEL.

No. 917,883.  Specification of Letters Patent.  Patented April 13, 1909.

Application filed June 17, 1907. Serial No. 379,433.

*To all whom it may concern:*

Be it known that I, GEORGE W. MORRIS, a subject of the King of Great Britain, residing at Racine, county of Racine, State of Wisconsin, have invented certain new and useful Improvements in Vehicle-Wheels, of which the following is a specification, reference being had to the accompanying drawings.

This invention relates to wheels adapted for use in connection with various kinds of vehicles.

More particularly, it relates to that class of wheels in which a series of coiled springs are employed to absorb the shock incident to the use of the wheel on uneven roadways.

The objects of the invention are to produce a strong and durable wheel of this class in which is embodied new and improved means for maintaining the separate outer rim or tire with which the wheel proper is provided always in proper relation to the other parts of the wheel; to provide improved means for maintaining in proper position, under all conditions of use, the springs referred to, which springs are members of the struts that radiate from the hub, whereby all twisting or distortion of the springs that might otherwise be caused by an independent movement of the outer rim is prevented; and to generally improve the construction and operation of wheels of this class.

I attain these objects by the devices and combinations of devices shown in the drawings and hereinafter specifically described.

That which I believe to be new will be set forth in the claims.

Figure 2:
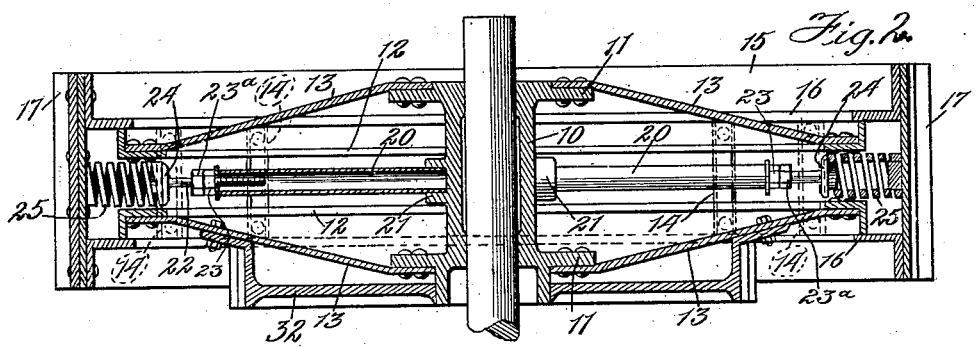

In the accompanying drawings:—Figure 1 is a side elevation of my improved wheel. Fig. 2 is a central cross-section through the wheel. Fig. 3 is a vertical central section through the wheel. Fig. 4 is a detail, showing the means employed for transmitting the driving stresses from the wheel proper to the outer rim or tire. Fig. 5 is a detail, being a plan view of the means employed for maintaining the members that extend between the hub and the outer rim or tire in proper position and preventing distortion of the spring portion of such members.

In the several figures of the drawings, in which corresponding parts are indicated by like reference characters, 10 indicates the hub of the wheel, at the ends of which are formed annular flanges 11.

12 indicates the rim of the wheel proper, said rim being constructed, as shown, of two angle iron rings spaced a distance apart and held apart by a number of braces 14 (see Fig. 2) suitably secured to them.

13 indicates the spokes of the wheel, riveted or otherwise secured at their lower ends to the flanges 11 of the hub 10 and at their outer ends riveted or otherwise suitably secured to the inwardly-turned flanges of the two angle irons that constitute the said rim 12.

15 indicates an outer rim or tire which, of course, is concentric with the rim 12 of the wheel proper, said rim or tire 15 being, in the construction shown, formed of a heavy band which at each side and on its under face has riveted to it angle iron rings 16, as best shown in Fig. 2. These angle iron rings 16 are spaced sufficiently apart to allow the projection between them, as also best shown in Fig. 2, of the inner rim 12. By reason of the projection of this inner rim 12 between the said angle iron rings 16, such rim 12 and the outer rim or tire are held together so that said outer rim or tire will not become laterally displaced. It is to be understood that while the rim 12 fits snugly in between the angle iron rings 16, the fit is not to be so tight as to prevent free vertical play between the parts.

The wheel shown is particularly designed for use in connection with a traction engine, and I have therefore shown the outer rim or tire provided on its outer face with the ordinary diagonally-extending cleats or grouters 17.

18 indicates a heavy stud depending centrally from a plate riveted to the under face of the outer rim or tire 15 and sufficiently long to project some little distance below the outer edges of the angle irons that constitute the inner wheel rim 12. This stud 18 extends down between these two angle irons 12, and, extending across such angle irons and suitably secured to their upper flanges, are two strong plates one at each side of said stud 18. By the engagement of the stud with one or the other of these plates 19, the wheel proper and the outer rim or tire are compelled to move together, as of course the driving stresses from the wheel will be thus communicated to the outer rim or tire.

20 indicates the inner members of a series of struts radiating from the hub 10, the inner ends of such members being placed and properly secured in suitable sockets 21 formed on the exterior of the central portion of said hub. These strut members 20, in the construction shown, (see Fig. 2), are tubular, and into the outer end of each projects an extensible member 22 in the form of a heavy rod that is screw-threaded on its inner end to engage a nut 23 that rests upon the outer end of the tubular strut member 20. A set nut 23ª may be employed, as shown, if desired, to hold the part 22 in the position to which it is adjusted. At the outer end of each extensible member 22 is formed a suitable head 24, adapted to engage the inner end of one of the coiled springs 25 which form the outer members of the struts. It is this series of coiled springs 25 that maintains the outer rim or tire 15 properly held away at all points from the inner wheel rim 12, but if such springs bore directly at their outer ends upon the inner face of the rim or tire 15 it is evident that as such outer and inner rims were brought close together on account of the shock due to the wheel passing over an uneven roadway, or by the imposition of an unusually heavy load upon the vehicle to which the wheel was attached, the springs would become distorted by being bent in the direction of the travel of the wheel and the entire strut structure,—by which term, as before explained, I include the members 20, 22 and 25,—would be unduly strained and possibly broken. To overcome this difficulty, therefore, I provide for use in connection with each strut a shoe 26 the inner face of which is adapted to receive the outer end of the spring 25, and the outer face of which is curved to conform to the curvature of the outer rim or tire against the inner face of which such shoe bears. The shoe is not secured to the outer rim or tire, being left free so as to permit of a sliding movement between it and the rim or tire when required. One end of each shoe has formed on it an ear 27, through which ear and through the ends of a pair of links 28 passes a pivot bolt 29. As best shown in Fig. 5, each pair of links diverges from its point of connection with a shoe, and the diverging ends lie against the down-turned flanges of the angle iron rings 12, to which they are pivotally attached by a suitable pivot 30 extending through them and through said down-turned flanges of the angle iron rings 12. In the construction shown (see Fig. 5), a short sleeve 31 in the nature of a washer is mounted on the pivot bolt 30 between the diverging ends of the links 28.

From the construction described, it will be seen that I have provided a wheel in which ample protection is given to the strut members that support the outer rim or tire under all conditions of use to which the wheel may be subjected.

When the wheel is used in connection with a traction engine, the weight of the load imposed on the wheel can be known in advance with a reasonable degree of accuracy and springs of suitable stiffness and properly adjusted will be provided so that with a comparatively smooth roadway the springs will yield only sufficiently to render the movement of the vehicle an easy one but will not yield normally sufficiently to bring the inner and outer rims 12 and 15 close together. If, however, owing to inequalities in the roadway and consequent jolting, the two rims are brought close together, the result will be, owing to the rigid pivoted links 28, to cause a sliding relatively between the shoes 26 and the outer rim or tire 15, thus insuring the maintaining of the springs under all conditions in proper position and preventing that straining in the direction of the travel of the wheel of the strut members as a whole that would otherwise inevitably occur if they were connected directly to the outer rim or tire.

I have called attention to the fact that the drawings illustrate a wheel more especially designed for use in connection with traction engines, and therefore there is shown secured to one face of the wheel a large gear indicated by 32, which is adapted to mesh with the driving gear of the engine. It is to be understood, however, that my improvements are equally applicable to wheels designed for other uses, and in which such gear wheel would not be employed.

What I claim as my invention and desire to secure by Letters Patent is:—

1. A wheel comprising in combination an inner and an outer rim, a hub, spokes uniting said hub and inner rim, a device for connecting the two rims so that they will move together, struts radiating from the hub and projecting beyond said inner rim, each of said struts comprising a yielding member, a shoe interposed between the outer end of each strut and the inner surface of said outer rim, and a link pivoted to said shoe and also pivoted to the wheel between the hub and the periphery of the inner rim.

2. A wheel comprising in combination a hub, spokes and an inner and an outer rim, said inner rim being slotted and having attached thereto strips bridging said slot, a stud depending from said outer rim and projecting into the slot in the inner rim between two of said bridging strips, a series of resilient struts radiating from the wheel hub and projecting through the slot in the inner rim, sliding shoes interposed between said outer rim and said struts, and a link pivoted to each shoe and also pivoted to the said inner rim.

3. A wheel comprising in combination a hub, spokes and an inner and an outer rim, said inner rim being formed of two pieces of angle-iron spaced a distance apart and strips connecting said angle-irons together, said outer rim surrounding said wheel rim and held at a distance therefrom and connected therewith so that said two rims will turn together, and said outer rim being provided at each side with means that project inward opposite the sides of said inner rim, a series of resilient struts radiating from the wheel hub and projecting between the angle-iron members of said inner rim, sliding shoes interposed between said outer rim and said struts, and a link pivoted to each shoe and also pivoted to said inner rim.

GEORGE W. MORRIS.

Witnesses:
 C. R. CARPENTER,
 HARVEY FORD.